United States Patent
Janiszewski et al.

[19]

[11] Patent Number: 5,836,848
[45] Date of Patent: Nov. 17, 1998

[54] TRANSMISSION FOR A FOUR WHEEL DRIVE VEHICLE WITH A TRANSVERSE ENGINE

[75] Inventors: Grzegorz Janiszewski, Angered; Kjell A. C. Bergström, Gothenburg, both of Sweden

[73] Assignee: AB Volvo, Gothenburg, Sweden

[21] Appl. No.: 919,263

[22] Filed: Aug. 28, 1997

[30] Foreign Application Priority Data

Aug. 28, 1996 [SE] Sweden .................................. 9603117

[51] Int. Cl.⁶ ...................................................... F16H 3/64
[52] U.S. Cl. ........................... 475/204; 475/198; 475/223
[58] Field of Search ................................. 475/204, 206, 475/198, 220, 223, 205

[56] References Cited

U.S. PATENT DOCUMENTS

| | | | |
|---|---|---|---|
| 4,299,140 | 11/1981 | Kako et al. | 475/198 X |
| 4,417,642 | 11/1983 | Suzuki et al. | 475/206 X |
| 4,431,079 | 2/1984 | Suzuki . | |
| 4,779,699 | 10/1988 | Hatano | 180/248 |
| 4,817,753 | 4/1989 | Hiketa | 475/206 X |
| 4,969,532 | 11/1990 | Oyama et al. | 475/198 X |
| 5,041,068 | 8/1991 | Kobayashi | 475/206 X |
| 5,083,478 | 1/1992 | Hiraiwa . | |
| 5,462,496 | 10/1995 | Dick et al. | 475/206 X |
| 5,685,389 | 11/1997 | Muller | 475/198 X |
| 5,692,987 | 12/1997 | Shibahata et al. | 475/204 |

FOREIGN PATENT DOCUMENTS 0 091 406  10/1983  European Pat. Off. .

Primary Examiner—Charles A. Marmor
Assistant Examiner—Peter T. Kwon
Attorney, Agent, or Firm—Young & Thompson

[57] ABSTRACT

Vehicle transmission consisting of a basic gearbox (1) and a supplemental gearbox (11), comprising a planetary gear set (23) with a direct drive mode and a crawl mode, a differential (31) between two front wheel drive axles (35,36) and an angle gear set (39,41) for transmitting torque to a rear axle differential. Shifting between direct drive mode and crawl mode is achieved with an axially displaceable engagement sleeve (17) which, in direct drive mode, transmits torque from the basic gearbox directly to the differential between the front axles and in the crawl mode transmits torque to the sun gear (26) of the planetary gear set.

6 Claims, 2 Drawing Sheets

TRANSMISSION FOR A FOUR WHEEL DRIVE VEHICLE WITH A TRANSVERSE ENGINE

FIELD OF THE INVENTION

The present invention relates to a transmission for a four wheel drive vehicle with a transversely mounted engine, comprising a basic gearbox with a plurality of gear speeds between input and output elements, a supplementary gearbox driveably coupled to the output element and being of planetary type with a planet gear carrier which is joined to a differential housing in a differential gear set between two drive wheel axles and with a gear in an angle gear shaft and an engaging device cooperating with the planetary gear set and having a first position in which the torque from the output element of the basic gearbox is transmitted without any change in rotational speed, and a second position in which the torque is transmitted with a change in rotational speed to the differential housing.

BACKGROUND OF THE INVENTION

Transmissions of this type are sometimes used in four wheel drive vehicles fulfilling the requirements of good comfort when driving on-road and having a gear step for off-road driving which is lower (has a higher transmission ratio) than the lowest gear of the basic gearbox, i.e. first gear. This extra gear step, which is usually called the crawl gear, usually has an appreciable rpm reduction relative to first gear, in the order of 1:3, and therefore a supplementary gear set of planetary type is employed for the crawl gear.

Off-road vehicles are much less common than pure highway vehicles and in the design of off-road vehicles, which constitutes a modification of existing on-road models, it is therefore important that the drive system be designed so that as many components as possible are in common and so that the transmission for the off-road model encroaches as little as possible on the space already used for other components in the on-road model.

An additional factor to take into account as regards the design of a crawl gear transmission for a vehicle which is capable of being driven off-road with the crawl gear engaged and on-road without use of the crawl gear, is that the total driving time the crawl gear is used is normally very small and therefore the gearbox should be optimized for direct drive as regards wear.

From EP 91406 a transmission of the type described by way of introduction is previously known. The torque is in this case transmitted from an output gear in the basic gearbox to an external toothed rim on a ring gear engaging a planetary gear, the planetary gear carrier of which being solidly joined to the differential housing of a differential between the front wheel axles of the vehicle. The sun gear of the planetary gear set is solidly joined to a hollow shaft which supports a hub for an engage sleeve which is axially displaceably but non-rotatably mounted on said hub. With the aid of the engaging sleeve the sun gear can either be locked relative to the ring gear for direct drive or to a stationary housing part for rpm reduction, i.e. crawl mode. This crawl gearbox contains a number of components which must be dimensioned with regard to the relatively high load on the planet gear set due to the so-called twisted torque between the planetary gear carrier and the ring gear when in direct drive mode, i.e. the mode used practically all of the time. The size of the twisted torque depends on the ratio between the radii of the sun gear and the ring gear. Due to the fact that a number of components must be dimensioned for high load under a long period of time, the crawl gear will be relatively expensive and space consuming.

OBJECT OF THE INVENTION

The purpose of the present invention is in general to achieve a transmission of the type described by way of introduction, which can be manufactured as a simple and compact unit, which can transmit high torque. In particular the purpose is to achieve a transmission with a planetary gear set which can be dimensioned without taking into account the effect of twisted torque.

SUMMARY OF THE INVENTION

This is achieved according to the invention in a transmission of the type described by way of introduction by virtue of the fact that the planet gears mesh with a non-rotatably fixed ring gear and that the engaging device, in its first position, releases the sun gear of the planetary gear set and transmits torque from the output element directly to the planetary gear carrier and, in its second position, locks the sun gear to the output clement for transmitting torque via the planet gear to the planet gear carrier.

Operation in direct drive mode in this manner with the sun gear completely released transmits torque from the output element (shaft or gear) from the basic gearbox to the planetary gear carrier and from there directly to the differential housing between the wheel hub axles eliminates the effect of twisted torque.

In order to use as many common components as possible in two wheel drive and four drive vehicles in the same basic configuration, in a preferred embodiment of the transmission according to the invention, the output element of the basic gearbox is the differential housing with an exterior toothed rim having no differential gear. For a four wheel drive model, the complete basic gearbox of the two wheel drive model integrated with the differential is used with the only difference being that the differential housing has been emptied and is connected via clutch to the planetary gear carrier of the crawl gear set.

In order to, as in this case, synchronize relatively large masses, synchronizing devices which can withstand high synchronizing torques are required. As coupling and synchronizing devices there can be used fiction couplings or brakes of the type which are common in planetary gear steps in automatic transmissions. In a preferred embodiment of the transmission according to the invention, there is used however, an engaging device comprising a sleeve rigidly joined to the output element said sleeve forming a hub for an engaging sleeve axially displaceable inside said hub but non-rotatably mounted, said engaging sleeve having interior engaging teeth, which in the first position engage the engaging teeth of an element rigidly jointed to the planet gear carrier, and in the second position engaging teeth on an element rigidly joined to the sun gear. This provides simply the possibility of coupling the planet gear carrier directly to the output element of the basic gearbox without having to detour via the planet gears.

In a preferred embodiment of such a transmission, synchronizing devices are used in the form of triple synchronisers which are known per se.

BRIEF DESCRIPTION OF THE DRAWINGS

The invention will be described in more detail below with reference to examples shown in the accompanying drawings, where.

DETAILED DESCRIPTION OF THE INVENTION

Figure 1:
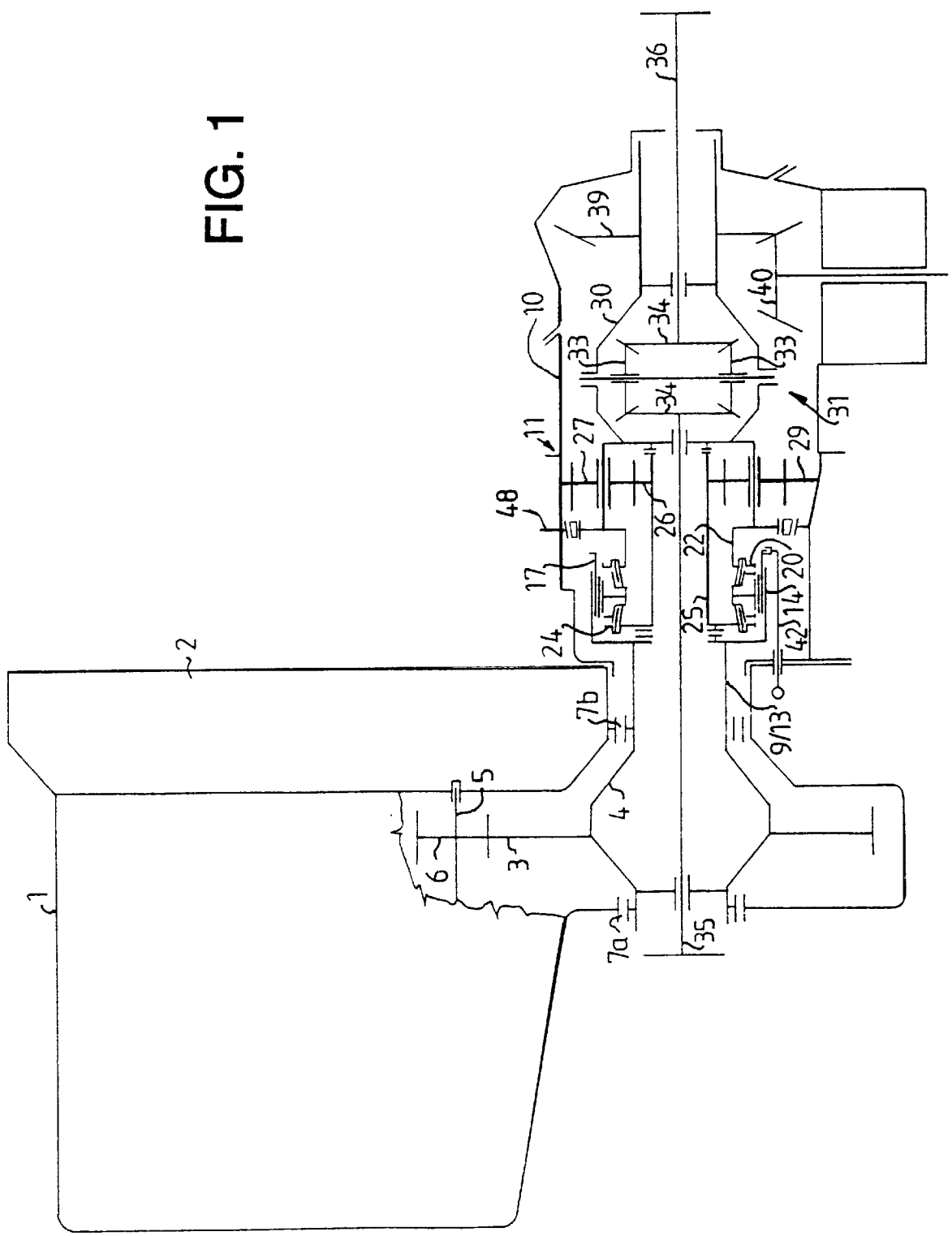
FIG. 1 shows schematically one embodiment of a transmission according to the invention consisting of a basic gearbox and a supplementary gearbox.

In FIG. 1, the numeral 1 designates the housing of a basic gearbox, which has one plane 2 intended to be screwed securely to an end plane of a transversely mounted engine (not shown), The gearbox 1 can be of the type which is known by SE-A-8003158-6 and which has an input shaft which can be connected to the engine clutch and two lay shafts which are non-rotatably fixed gears meshing with a crown gear 3 which is fixed to a differential housing 4. In FIG. 1 only one of the lay shafts 5 is shown with its gear meshing with the crown gear 3. The differential housing 4 is mounted in bearings 7a, 7b in the housing 1 of the gearbox and has a neck portion 9 which extends into the housing 10 of a supplementary gearbox generally designated 11. The housing 10 is screwed securely to the housing 1 with screws 12.

The neck portion 9 of the differential housing 4 is non-rotatably splined to a tubular portion 13 which is made in one piece with a hub sleeve 14 which is provided with internal splines 15, 16 engaging corresponding exterior splines on an axially displaceable engaging sleeve 17, which is provided with interior engaging teeth 18. A first engaging ring 20 provided with corresponding teeth is made in one piece with a sleeve portion 21 which is a part of a planet gear carrier 22 of a planetary gear set generally designated 23. A second engaging ring 24 provided with corresponding teeth is made in one piece with a hollow shaft 25 on which the sun gear 26 of the planetary gear set 23 is non-rotatably fixed. The sun gear 26 meshes with a number (e.g three) of peripherally distributed planet gears 27 which are rotatably mounted on stab shafts 28 carried by the planet gear carrier 22 and which mesh with a ring gear 29 which is fixed to the interior of the supplemental gearbox housing 10.

The planet gear carrier 22 constitutes a part of a differential housing 30 for a differential 31, which comprises smaller differential gears 33 mounted on a shaft 32, and meshing with larger differential gears 34 mounted on either drive axle 35, 36 for the vehicle front wheels. As can be seen in the Figures, the drive axle 35 extends through a differential housing 4 which lacks a shaft 32 and differential gear 33, 34. This arrangement is due to the fact that the same basic gearbox with integrated differential is used both for the front wheel drive and the four wheel drive version of the same vehicle type. The difference is that the differential housing 4 in the four wheel drive version is only a torque transmitting element without any differential function, since this is taken over by the differental 31. The differential housing 30 is mounted with a tubular extension 30a in a bearing 37 in an end 38 of the housing 10. On the tubular extension 30a a bevel gear 39 is non-rotatably fixed. The gear 39 engages a gear 41 non-rotatably fixed to a shaft 40 and form together therewith an angle gear set for transmitting torque to the vehicle rear axle (not shown).

The engaging sleeve 17 is axially displaceable with the aid of an operating rod 42 which can move the sleeve said operating rod 42 being connected to driver actuated operating means. In its right hand end position, the engaging teeth of the engaging sleeve 17 engage the teeth of the engaging ring 20 and thus lock the planetary gear carrier 22 to the hub sleeve 14, so that the torque is transmitted directly from the output element, i.e. the differential housing 4, from the gearbox 1 to the planetary gear carrier 22 and consequently—without any detour via the gears of the planetary gear set—to the differential housing 30. To engage the crawl gear, the engaging sleeve 17 is displaced to its left hand end position, whereupon the planet gear carrier 22 is released and the teeth of the engaging sleeve 17 are brought into engagement with the teeth on the engaging ring 24, so that the hollow shaft 25 with the sun gear 25 is locked to the hub sleeve 14. The torque is now transmitted with speed reduction to the differential housing 30.

Figures 2, 3:
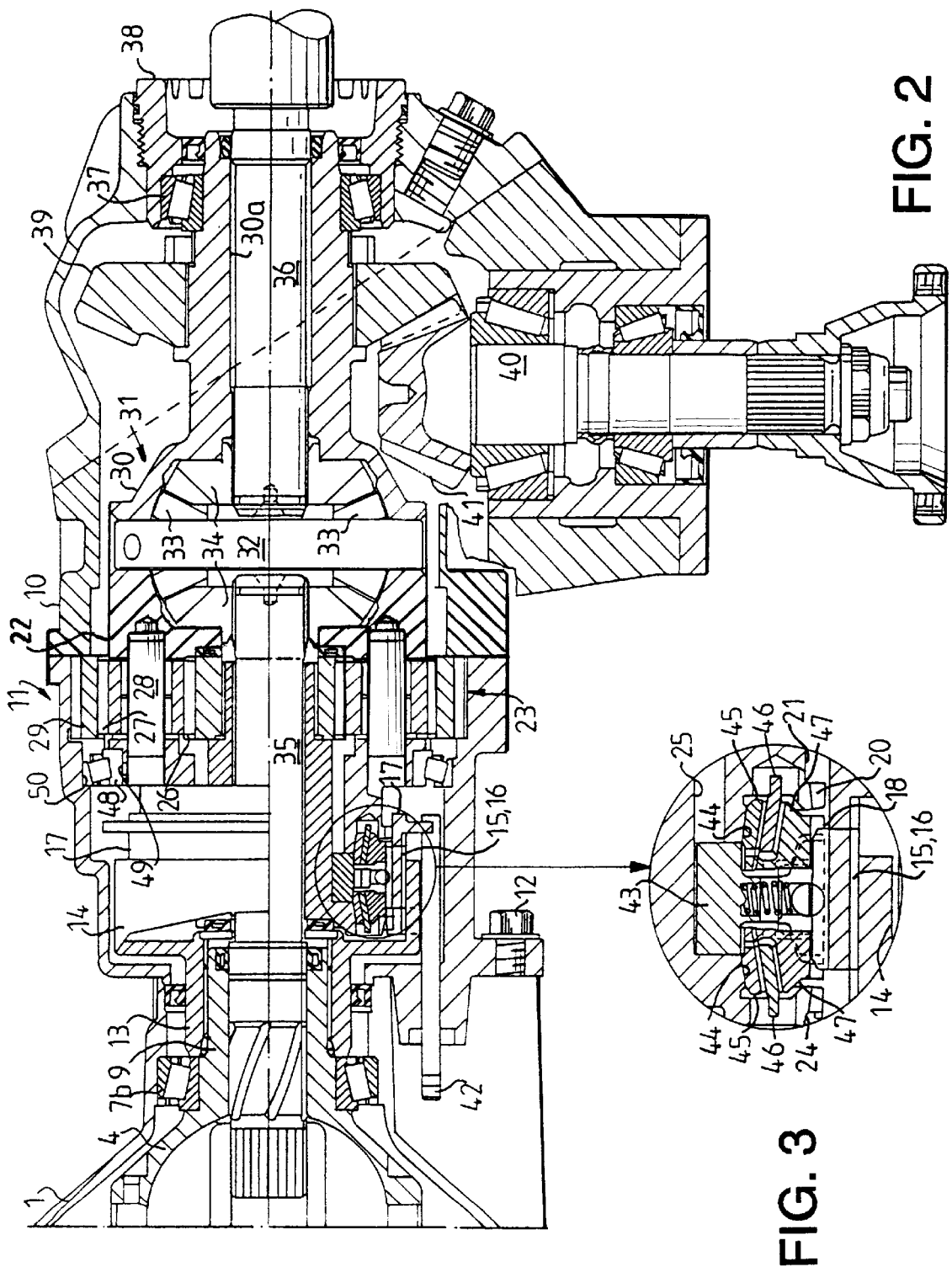
FIG. 2 shows a longitudinal section through one embodiment of a supplementary gearbox and FIG. 3 is an enlargement of the circled area in FIG. 2.

The differential housing 4 with associated crown gear 3 constitutes a mass, the rotational speed of which must be synchronized with the rotational speed of the sun gear 26 or the planet gear carrier 22 when shifting. This places heavy requirements on the synchronizing device which cooperates with the engaging sleeve 17 and, in the example shown in FIG. 2, the synchronizing device is a so-called triple synchronizer cooperating with the respective engaging ring 20, 24. This comprises a synchronizing hub 43 which is mounted for rotation relative to the hollow shaft 25 of the sun gear 26 and has on its outer periphery grooves in which the teeth 18 of the engaging sleeve 17 engage. The respective engaging ring 20, 24 is made with an engaging cone 44 in contact with an inner synchronizing ring 45. Radially outside the inner synchronizing ring 45 there is an intermediate ring 46 and radially outside this ring there is an outer synchronizing ring 47. The triple synchronization shown differs essentially from previously known triple synchronizations only as regards the mounting of its hub 43. Otherwise there are no structural or functional differences. As can be seen from FIG. 2, the radial dimension of the hub sleeve 14 is as large as the housing 10 permits in order to achieve radii which are as large as possible in the synchronizing surfaces. In the example shown in FIG. 2, the inner radius of the sleeve 14 is somewhat greater than the radius of the rotational circle described by the stub shafts of the planet gears 27.

The planet gear carrier 22 is mounted in a tapered roller bearing 48 between a circular exterior surface 49 on the planetary gear carrier 22 and a circular interior surface 50 on the housing 10 of the supplemental gearbox.

What is claimed is:

1. Transmission for a four wheel drive vehicle with a transversely mounted engine, comprising a basic gearbox (1) with a plurality of gear speeds between input and output elements (4), a supplementary gearbox (11) driveably coupled to the output element and being of planetary type with a planet gear carrier (22) which is joined to a differential housing (30) in a differential gear set (31) between two drive wheel axles (35,36) and with a gear (39) in an angle gear set and an engaging device (14,17,20,24) cooperating with the planetary gear set and having a first position in which the torque from the output element of the basic gearbox is transmitted without any change in rotational speed, and a second position in which the torque is transmitted with a change in rotational speed to the differential housing, characterized in that planet gears (27) of the planetary gear set mesh with a non-rotatably fixed ring gear (29) and that the engaging device, in its first position, releases a sun gear (26) of the planetary gear set and transmits torque from the output element (4) directly to the planet gear carrier (22) and, in its second position, locks the sun gear (26) to the output element (4) for transmitting torque via the planet gears to the planet gear carrier.

2. Transmission according to claim 1, characterized in that the engaging device comprises a sleeve (14) rigidly joined to the output element (4), said sleeve forming a hub for an engaging sleeve (17) axially displaceable inside said hub but non-rotatably mounted, said engaging sleeve having interior engaging teeth (18), which in the first position engage the engaging teeth of an element (20) rigidly jointed to the planet gear carrier, and in the second position engaging teeth on an element (24) rigidly joined to the sun gear (26), and that the engaging sleeve cooperates with synchronizing means (43–47).

3. Transmission according to claim 2, characterized in that the synchronizing means comprise radially outer and inner synchronizing rings (45,47) and an intermediate ring (46) lying therebetween and being limitedly axially displaceable but non-rotatably mounted in conjunction with respective elements (20,24) provided with engaging teeth.

4. Transmission according to claim 2, characterized in that the output element of the basic gearbox is a differential housing (4) provided with an exterior toothed rim (3), said differential housing (4) lacking differential gears and through which a drive axle (35) extends.

5. Transmission according to claim 2, characterized in that the hub sleeve (14) has an interior radius which is greater than the rotational circle on which the rotational axes of the planet gears (27) lie.

6. Transmission according to claim 1, characterized in that the planet gear carrier (22) is mounted in bearings (48) between an exterior surface (49) on the planet gear carrier (22) and an interior surface (50) on a wall of a housing (10) which encloses the planetary gear set.

* * * * *